Nov. 21, 1961  G. J. SYKOKIS  3,009,562
CONTROLLED CONVEYOR DRIVING MECHANISM
Filed March 18, 1957  2 Sheets-Sheet 1

Nov. 21, 1961  G. J. SYKOKIS  3,009,562
CONTROLLED CONVEYOR DRIVING MECHANISM
Filed March 18, 1957 2 Sheets-Sheet 2
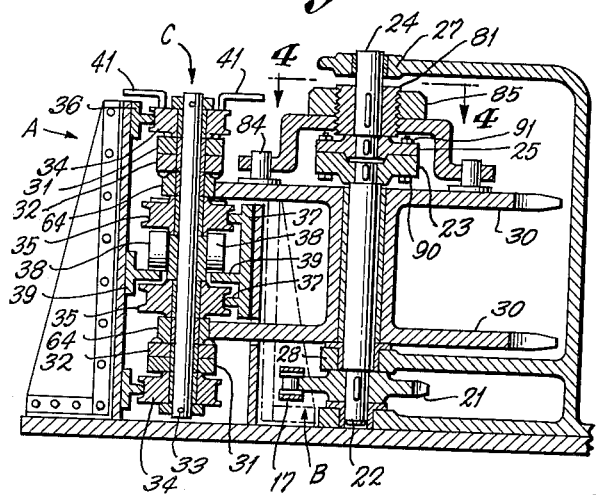
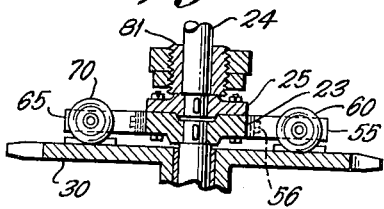
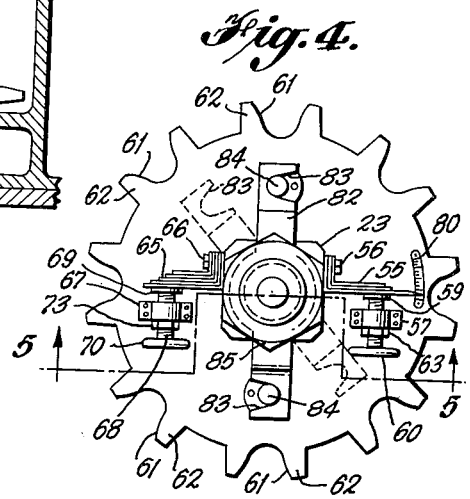
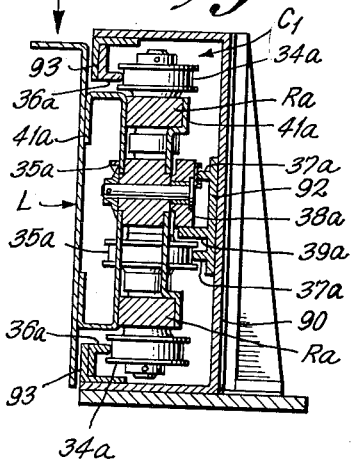

United States Patent Office 3,009,562
Patented Nov. 21, 1961

3,009,562
CONTROLLED CONVEYOR DRIVING MECHANISM
George John Sykokis, 28 Ierosolymon St., Athens, Greece
Filed Mar. 18, 1957, Ser. No. 646,934
7 Claims. (Cl. 198—203)

This invention relates to endless chain conveyors and particularly to those performing useful conveying work throughout the whole length of their closed path and including guiding elements and multiple drive elements for the chain for the purpose of reducing the deterioration of the conveyor chain to the minimum.

More particularly this invention concerns improvement in the multiple drive elements comprising means permitting the control and regulation of the action of the multiple drive elements on the conveyor chain.

This invention is a continuation in part of my pending application No. 322,951 for Conveyor Driving Mechanism filed on November 28, 1952, now abandoned, which in turn is a continuation in part of the application No. 147,225, now Patent No. 2,787,366, for Chain Conveyors of Multiple Drive, filed on March 2, 1950, which also is a continuation in part of the application No. 51,438 filed on September 27, 1948, for Combined Conveyors of Continuous Motion.

In the attainment of the object of this invention I provide a conveyor comprising an articulated endless conveyor chain, guiding means defining a path of movement for the chain, a plurality of sprockets engaging said chain at longitudinally spaced points, and driving elements arranged to synchronously rotate said sprockets and means adapted to supply said sprockets simultaneously with driving forces to said chain and to control and regulate the extent of the action of said driving forces at said spaced points of the chain.

According to the present invention I also provide a conveyor comprising an articulated endless chain having links pivotally coupled by pivot pins, a conveyor track frame defining a closed path for the chain, a series of spaced sets of cooperating rollers and guide rails on said chain and said track frame guiding and supporting accurately the chain throughout the whole length of said closed path on both sides of the plane through said pins and on both sides of a plane normal to said pins, to counteract components on said chain of forces crossing said path and to prevent deviation of any portion of said chain from said path and conveyor chain sprockets engaging said chain at spaced locations being driven synchroneously by a driving motor and means adapted to supply said sprockets simultaneously with driving forces to said chain and control and regulate the action of their teeth on said pins of said chain at said spaced locations.

Other objects of the invention will be apparent from the following description taken in connection with the accompanying drawings, wherein:

FIG. 3 is a cross-sectional view taken in the line 3—3 of FIG. 1.

FIG. 4 is a partial plane view 4—4 of FIG. 3 showing the means for controlling the pressure of the teeth of the conveyor chain sprockets on the pins of the conveyor chain.

FIG. 5 is a cross-sectional view taken in the broken line 5—5 of FIG. 4.

FIG. 6 is a transverse sectional view showing a sprocket used with a modified form of support of the conveyor chain of FIG. 1, round the sprockets.

FIG. 7 is the modified manner of FIG. 6 of support of the conveyor chain between the sprockets.

Figure 1:
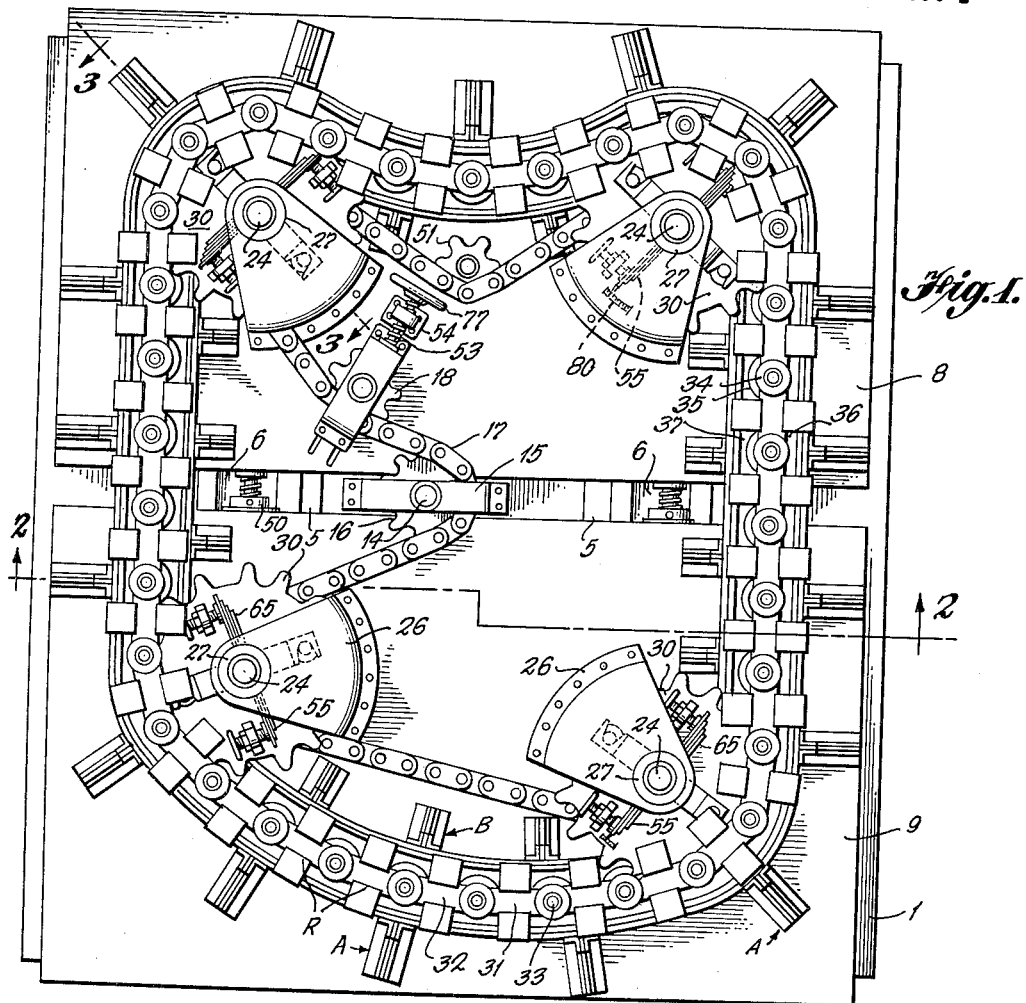
FIG. 1 is a top plan view of a conveyor embodying the invention.

In the form shown in the drawings, the present invention is an improvement of the chain conveyor and its functioning shown in FIG. 1 of the application No. 322,951.

Figure 2:
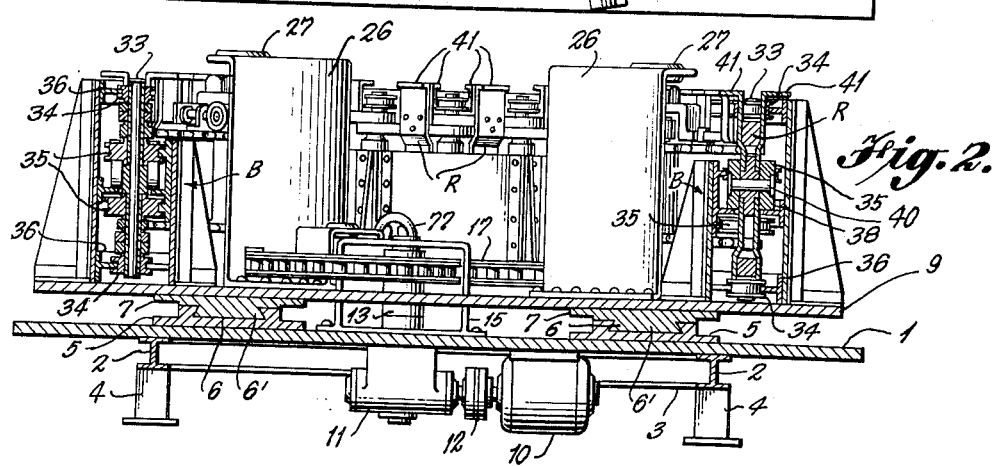
FIG. 2 is a transverse sectional elevation taken substantially on the broken line 2—2 of FIG. 1.

In the embodiment selected to illustrate the invention, the table 1, FIG. 1, is supported through a frame consisting of the double T beam forms 2 and 3, on the bases 4, FIG. 2. On table 1 are mounted at length two parallel forms 5, FIG. 2, having each a prismatic slide 6. Two parallel forms 7, are also mounted on the tables 8 and 9, FIG. 1. Forms 7 have the prismatic guides 6', 6', fitting into the prismatic slides 6, 6 of the forms 5. Thus the tables 8 and 9 are supported on the table 1 through the forms 5 in contact of their slides 6, 6 with the guides 6', 6' of the forms 7. This manner of support permits the translation of the tables 8, 9 slidably with respect to table 1. Under table 1 is mounted the driving motor 10 which, in combination with the reducer 11 and the joints 12 and 13, rotates the shaft 14 supported by the bearing 15, fixed on the table 1. On the shaft 14 the driving sprocket 16 is mounted. The power chain 17 is driven by the sprocket 16. Chain 17 engages the tensioning sprocket 18 splined on the shaft 19 supported on the bearing 20 fixed on the table 8, and also engages four sprockets as is the one enumerated by the number 21, splined on each lower part of four shafts 22, FIG. 3. A substantially rectangular plate 23 is keyed on each upper part of shafts 22. Correspondingly, four shafts 24, FIG. 1, have each a plate 25, FIG. 3, keyed on the one of their ends. One shaft 22 and one shaft 24 are coaxially joined together through the plates 23 and 25 by the screw thread bolts 90 and the nuts 91.

Each of said pair of shafts 22 and 24 is supported on the bearing 26 at its flanged parts 27, 28 and 29.

The shafts 22 have each three diameters, one the greater in the middle and two, the smaller, at their ends. On the one of the smaller diameter the lower, FIG. 3, is splined, as is said, the sprocket 21. On the part of the shaft 22 having the greater diameter is placed a conveyor chain sprocket consisting of two teeth plates 30. Sprocket 30, 30 is not splined on that part of shaft 22 but it may rotate freely and precisely about this shaft. The sprockets 30, 30 engage the conveyor chain which in FIG. 3 is enumerated by the letter C. The structure of chain C as well as the manner of its support along its orbit of travel constitutes the original form of a category of chain conveyors characterized by that, their conveyor chain is supported and guided accurately on a guide structure on line of support on both sides of the plane through the pins of said chain and on both sides of the plane normal to said pins by set of rollers spaced along the orbit of travel of the conveyor chain and operating on the lines of support as above.

Thus chain C comprises a plurality of outer link plates 31 and inner link plates 32 coupled together by the elongated pins 33. On each pin 33 two rollers 34 are placed one at either end of the pin. Also two rollers 35 are spaced on the middle of the pin 33 substantially in symmetrical position with respect to rollers 34. The co-axial rollers 34 and 35 of the conveyor chain C touch the two guides 36 and the two guides 37 respectively, FIG. 3, FIG. 2. That is, chain C is supported on guide rails on both sides of the planes through the pins 33 and on both sides of the plane cutting the plane through said pins. Additional support of the chain C is accomplished through two rollers 38 placed in every pitch of the chain in touch with the pair of guides 39. Each pair of rollers 38 rotate about the shaft 40. FIG. 2, mounted on two brackets 41, destined to carry the loads of the conveyor. Brackets 41 are fixed on the parts enumerated by the letter R, of the inner and outer link plates 31 and 32. The parts R of said link plates are in the middle of same between the holes through which the pins 33 pass, FIG. 1. The two guides 36, and the one of the guides 39 are supported on a plurality of constructions A well known in the art. The two guides 37 and the other guide 39 are supported on a plurality of similar constructions B, FIG. 3, FIG. 1, FIG. 2.

The two guides 37 and the one guide 39 supported as is said on the forms B, in the regions round the sprockets 30, 30 continue concentrically to the two guides 36 and the other guide 39, supported on the forms A, and pass through the two toothed plates 30 of the sprockets 30, 30. Thus the support of the chain C in the regions round the sprockets 30, 30 and between said sprockets is accomplished in a uniform way in a substantially full contact of the rollers 34 and 35 with the guides 36 and 37, respectively. The contact of the rollers 38 with the guides 39, as is apparent, owing to the weight of the conveyor chain C and the loads on it, is complete.

Chain C is placed within the guides 36, 37 and 39 so that not to be in any straining. Thus chain C while it is at rest will present the clearances determined by the precision of joining of the link plates 31 and 32 by pins 33, and the precision of touch of the roller 34, 35 and 38 with the guides 36, 37 and 39, respectively. Therefore, chain C will not behave by any means as a driving chain. It is, as will be set forth later, a chain pulled and pushed by the conveyor chain sprockets 30, 30 when the conveyor is in operation. The straining status of chain C is controlled by the tensioning mechanisms 50, 50 (well known in the art) causing opposite translations of the tables 8 and 9 by sliding of the guides 6' of forms 7 within the slides 6 of forms 5.

The power chain 17 engaging as is said the tensioning sprocket 18 and the sprockets 21 also engages the sprocket 51 in the concave part of the orbit of travel of the conveyor. Chain 17 is moved actuated, as is said, by the driving sprocket 16. The straining of the chain 17 is accomplished through sprocket 18 on the shaft 19 supported on the bearing 20, which moves slidably on the two grooves 52 pushed by the screw 53, screwed in the support 54, by means of regulating rotations of the wheel 77 fixed at the one end of the screw 53, FIG. 1.

At the one side of the plate 23 on each shaft 22 is mounted the spring 55 fastened by the screw 56, FIG. 4, FIG. 5. On the upper plate 30 of each sprocket 30, 30 is mounted a support 57 through which passes and screws the screw 58 which in one of its ends terminates in the foot 59. By means of the wheel 60 which is fixed at the other end of the screw 58, a pressure of the foot 59, of the screw 58, on the spring 55 may be exerted. Given that each sprocket 30, 30 may rotate freely about the shaft 22, said pressure of the feet of the screws 58 is imparted to the pins 33 of the chain C by means of the surfaces 61 of the teeth 62 because surfaces 61 of the two toothed plates 30 of each sprocket 30, 30 tend to push continuously the rollers 64 placed on the pins 33 of the chain C. In FIG. 4 the sprockets 30, 30 are considered to rotate to the direction of the hands of the watch, during the motion of the conveyor chain C. The pressure of the screws 58 on the springs 55 is finally firmed by the nuts 63.

At the other side of the plates 23 opposite to the sides where springs 55 are fixed, are mounted the springs 65 firmed by screws 66. Springs 65 are preferably stronger than springs 55. Here also there exist supports 67 through which pass and screw the screws 68 terminated in feet 69 on the one of their ends. At the other ends of said screws are fixed wheels 70. Nuts 73 firm the position of feet of the screws 68 with respect to the springs 65. The placing of the springs 65 is preventive, that is, to hinder the changing of the relation of the surfaces 61 of the teeth 62 with respect to the rollers 64, or what amounts to the same, to the pins 33 of the chain C. The exerted pressure of the surfaces 61 of the teeth 62 of the sprockets 30, 30 is controlled as follows. After the straining of the power chain 17 through the bearing 20 and the wheel 77 and the settlement of the straining status of chain C by the tensioning mechanisms 50, the feet 59 of the screws 58 by means of the wheels 60 exercise the desirable pressure on the springs 55. This pressure is indicated in the scales 80, placed on the upper toothed plates 30 by pointers adjusted on the springs 55 and it is then secured by the counter-balancing actions of the systems, springs 65, wheels 70, screws 68, as previously described. In other words by the described mechanisms and method, the teeth 62 of the sprockets 30, 30 exercise in a uniform way a continuous pressure on the pins of the conveyor chain C, constantly and simultaneously to the direction of motion of said chain.

On the shafts 24 are mounted the screws 81 on which the arms 82 are screwed. The two ends of each arm 82 are formed in two cavities 83 facing opposite each other. In the upper toothed plates 30 of the sprockets 30, 30 are mounted in 180° forms having each a cylinder 84. When the arms 82 screw on the screws 81, the cavities 83 touch simultaneously the two cylinders 84. Thus, after the above described regulation of the pressure of sprockets 30, 30 on the pins of the conveyor chain the cavities 83 of the arms 82 are brought in full contact with the cylinders 84. The nuts 85 then firm said position of the cavities 83 of the arms 82. During the motion of the conveyor by looking at the places of pointers on the springs 55 at the scale 80 the uniform pressure of the sprockets 30, 30 may be obtained by convenable handling of the mechanisms shown in FIG. 4 and FIG. 5 in conjunction with the tensioning mechanisms 50, FIG. 1.

The conveyor chain of FIG. 1 is shown to be driven by four conveyor chain sprockets. This is not limitative. That is, said chain may be driven by any number of conveyor chain sprockets spaced on both curved line and direct line parts of the path of the conveyor.

As is shown in FIG. 1, FIG. 2 and FIG. 3, the chain C is supported bilaterally on the constructions A and B. In FIG. 7 a unilateral support of the $C_1$ on forms $B_1$ is shown. The difference between chain C and chain $C_1$ consists in that chain C has only one roller 38a in every pitch, instead of two rollers 38 which has correspondingly the chain C. Also, it differs in that from the brackets 41 for carrying the loads of the conveyor the ones which face the side of the forms B in FIG. 2, right part, in FIG. 7 the corresponding brackets 41a reach and terminate in the part Ra in the middle of the internal and external link plates 32a and 34a. The other brackets in FIG. 7 marked also by 41a are curved symmetrically. The angular forms L having as their purpose to carry the loads are mounted on the as above curved brackets 41a. In FIG. 7 and FIG. 6 said loads are shown by arrows F.

The support of chain $C_1$ is the following. On forms 90 adjusted on the forms $B_1$ are mounted forms 92 having two guides 37a and one guide 39a on which the pairs of wheels 35a and the wheels 38a touch, respectively.

Forms 90 in each of their ends have the angles 93 on which the pairs of guides 36a are mounted. On these guides the pairs of wheels 34a touch. Thus chain $C_1$, FIG. 7, as the chain C, FIG. 2, is supported on both sides of the plane through the pins 33a and on both sides of a plane cutting normally said pins.

As is apparent, the plan view 4—4 of FIG. 6 and the plan view 4—4 of FIG. 3 are the same, that is the FIG. 4. Consequently, the bilateral support of the chain $C_1$ permits the adaptation of the mechanical system for controlling the pressure exerted on the pins 33a of the chain $C_1$ by the teeth of the conveyor chain sprockets 30, 30 through the medium of the rollers 64a.

Also, in FIG. 6 parts of forms 92 which have as is said the two guides 37a and the guide 39a, in the region round the sprockets 30, 30 are curved concentrically to the sprockets 30, 30 and the two guides 36a, and pass through the two toothed plates of the sprockets 30, 30. The ends of said parts of forms 92 are fixed on the structures $B_1$.

In the present invention the sprockets 21 and the chain 17 may be substituted by gears and shafts which connected drivingly with the driving motor 10 will rotate the parts of shafts 22 and 24 on which are placed and adapted the sprockets 30, 30 and the system controlling the pressure of the teeth of said sprockets on the pins of the conveyor chain as described previously.

What I claim is:
1. An endless chain conveyor comprising an endless articulated chain including links pivotally coupled together by pivot pins and adapted to carry load supporting elements, a conveyor track frame defining a precisely predetermined path for said chain, a plurality of longitudinally spaced sets of cooperating rollers and guide rails on said chain and said track frame, each of said sets including rollers engaging rails at points of contact on both sides of the plane of the pins and on both sides of a plane cutting the plane of the pins confining said chain against lateral deviation from said path, a plurality of sprockets engaging said chain at longitudinally spaced points, and driving means including a pair of resiliently drivingly interconnected elements which are adjustable relative to one another and arranged to rotate said sprockets synchronously to simultaneously supply driving forces to said chain at said spaced points.

2. An endless chain conveyor comprising an endless articulated chain including links pivotally coupled together by pivot pins and adapted to carry load supporting elements, a conveyor track frame defining a precisely predetermined path for said chain, a plurality of longitudinally spaced sets of cooperating rollers and guide rails on said chain and said track frame, each of said sets including rollers engaging rails at points of contact on both sides of the plane of the pins and on both sides of a plane cutting the plane of the pins confining said chain against lateral deviation from said path, a plurality of sprockets engaging said chain at longitudinally spaced points, said sprockets being supported for rotary movement, driving means operatively connected to said sprockets for rotating the sprockets synchronously to simultaneously supply driving forces to the chain at said spaced points, said driving means including an element disposed adjacent each of said sprockets, a resilient means providing a driving connection between each of said elements and the associated sprocket, and means for adjusting said resilient means to vary the relatively angular position of each of the elements and its associated sprocket.

3. An endless chain conveyor comprising an endless articulated chain including links pivotally coupled together by pivot pins and adapted to carry load supporting elements, a conveyor track frame defining a precisely predetermined path for said chain, a plurality of longitudinally spaced sets of cooperating rollers and guide rails on said chain and said track frame, each of said sets including rollers engaging rails at points of contact on both sides of the plane of the pins and on both sides of a plane cutting the plane of the pins confining said chain against lateral deviation from said path, a plurality of sprockets engaging said chains at longitudinally spaced points, a plurality of drive shafts, each of said sprockets being supported on one of said drive shafts and mounted for free rotation with respect thereto, means providing a driving connection between each of said drive shafts and the associated sprocket, said driving connection means including a resilient driving interconnection, means for adjusting said resilient driving interconnection for varying the relative angular position of said drive shafts and the associated sprockets, and driving means connected to said driving shafts for rotating the shafts synchronously.

4. An endless chain conveyor comprising an articulated chain, guiding means defining a precisely determined path for said chain, a plurality of sprockets engaging said chain at longitudinally spaced points, a plurality of drive shafts, one of said sprockets being rotatably journaled on each of said drive shafts for rotation with respect thereto, each of said driving shafts including a driving element fixed thereto for rotation therewith, the sprocket and the driving element of each of said shafts defining a pair of elements which are angularly adjustable relative to one another, one of each of said pair of adjustable elements having a resilient means connected thereto, the other of each of said pair of adjustable elements having an adjusting member adjustably mounted thereon and in engagement with said resilient means on the associated adjustable element, whereby the relative angular position of the adjustable elements of each of said pair of adjustable elements may be readily adjusted.

5. Apparatus as defined in claim 4, wherein auxiliary driving means is adjustably connected to each of said driving shafts, each of said sprockets having pin members connected thereto in engagement with the auxiliary driving means secured to the associated driving shaft.

6. Apparatus as defined in claim 4, including a second resilient means operatively connected to one of each of said pair of adjustable elements, and a second adjusting member adjustably mounted upon the other of each of said pairs of adjusting elements and being in engagement with said second resilient means.

7. An endless chain conveyor comprising an endless articulated chain including links pivotally coupled together by pivot pins and adapted to carry load supporting elements, a conveyor track frame defining a precisely predetermined path for said chain, a plurality of longitudinally spaced sets of cooperating rollers and guide rails on said chain and said track frame, each of said sets including rollers engaging rails at points of contact on both sides of the plane of the pins and on both sides of a plane cutting the plane of the pins confining said chain against lateral deviation from said path, a plurality of sprockets engaging said chain at longitudinally spaced points, and driving means arranged to rotate said sprockets synchronously, and means adapted for adjusting the angular position of said sprockets with respect to the associated portions of the conveyor chain, to supply their teeth driving forces to said chain simultaneously at said spaced points.

References Cited in the file of this patent

UNITED STATES PATENTS

| | | |
|---|---|---|
| 599,037 | Ford | Feb. 15, 1898 |
| 1,691,408 | Palmer | Nov. 13, 1928 |
| 1,843,453 | Littlefield | Feb. 2, 1932 |
| 1,864,822 | Heuze | June 28, 1932 |
| 2,787,366 | Sykokis | Apr. 2, 1957 |